(12) United States Patent
Vija

(10) Patent No.: US 7,385,200 B2
(45) Date of Patent: Jun. 10, 2008

(54) RE-BINNING METHOD FOR NUCLEAR MEDICINE IMAGING DEVICES

(75) Inventor: A. Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 45 days.

(21) Appl. No.: 11/236,385

(22) Filed: Sep. 27, 2005

(65) Prior Publication Data

US 2006/0065838 A1    Mar. 30, 2006

(51) Int. Cl.
*G01T 1/166* (2006.01)
(52) U.S. Cl. .............................. 250/363.04; 250/363.1; 250/369; 378/4; 378/19; 378/901
(58) Field of Classification Search .......... 250/363.04, 250/363.1, 369; 378/4, 19, 901
See application file for complete search history.

(56) References Cited

U.S. PATENT DOCUMENTS

| | | | | |
|---|---|---|---|---|
| 5,334,833 A | * | 8/1994 | Case et al. | 250/269.1 |
| 5,430,297 A | * | 7/1995 | Hawman | 250/363.1 |
| 5,565,684 A | * | 10/1996 | Gullberg et al. | 250/363.04 |
| 6,771,732 B2 | * | 8/2004 | Xiao et al. | 378/4 |

* cited by examiner

*Primary Examiner*—David Porta
*Assistant Examiner*—Casey Bryant

(57) ABSTRACT

A generalized rebinning method transforms SPECT projection data acquired with a first type of collimator into projection data as if it were acquired with a second type of collimator, for subsequent reconstruction using a 3-D algorithm devised for the second type of collimator. The method includes use of a non-stationary point-spread function in the conversion to account for image blurring.

40 Claims, 2 Drawing Sheets

RE-BINNING METHOD FOR NUCLEAR MEDICINE IMAGING DEVICES

BACKGROUND OF THE INVENTION

1. Field of the Invention

The present invention relates generally to nuclear medical imaging devices and more particularly relates to a method for converting SPECT projection data for different collimators.

2. Description of the Related Art

In a nuclear medicine imaging device, such as a gamma camera for obtaining either planar images or Single Photon Emission Computed Tomography (SPECT) images, a collimator is mounted to the face of the imaging device. The collimator collimates radiation (e.g., a gamma photon) which is emitted from a source within a patient before the radiation strikes a detector crystal. In FIG. 3, a block diagram is shown of an exemplary SPECT device. A radiation source 302 within an object to be imaged 304 (e.g., human body part) emits gamma photons that emanate from the object 304 and are captured by a detector 306, which converts the detected radiation into spatial projection data. A collimator 308 collimates the radiation and prevents non-orthogonal radiation from being detected. Such collimators typically include some sort of shielding, such as lead, with holes that allow radiation (e.g., photons) to pass through to the detector. In SPECT, the detector is moved about the object being imaged and acquires projection data from each of a number of different view angles. A processor 310 then constructs a 3-D SPECT image from the detected projection data using some sort of reconstruction process or algorithm. Standard reconstruction processes exist for parallel hole type collimators.

Collimators used in nuclear medicine can be parallel hole, converging (e.g., cone-beam) or diverging (e.g., fan-beam), or arbitrary hole. The geometries of different collimators give their outputs different characteristics. As a result, methods of constructing a SPECT image are typically customized for the type of collimator used during detection/collection of the image data. If data is collected with one type of collimator, but the reconstruction tool for constructing the image is for a different, second collimator, the data must be "rebinned" from spatial coordinates corresponding to the first collimator to spatial coordinates corresponding to the second collimator.

Rebinning methods exist. However, current rebinning methods do not account accurately for the effective 3D-beam angle of collimator holes and the effect of the Point Spread Function (PSF), which provides a measure of the amount of blurring of a single point due to non-ideal optics, as a function of the position of the hole on the collimator, i.e., PSF is not stationary for converging or diverging collimators. Effective angle resolution can be modeled as a Gaussian with the full-width half-maximum (FWHM) as:

$$FWHM\ \alpha HD/T\ (R+T);$$

wherein HD is the hole diameter for the holes of the collimator, T is the thickness of the collimator, and R is the distance from the collimator face to the rotation center of the imaging device.

The PSF in collimator coordinates (x,y) for a point source at distance R for a parallel hole collimator is thus, stationary. That is, PSF=constant $\Psi(x,y)$ when R=constant. In the case of a converging or diverging collimator (e.g., fan-beam, cone-beam, etc.) the hole length $L \ne T$, unlike the case as the parallel hole collimator. See FIG. 1. The hole (102) length L of a fan beam collimator can be calculated by: $L=T/(\sin \alpha)$. Thus, the FWHM becomes a function of the angle $\alpha$ of the fan beams (i.e., angle of the holes in relation to the surface of the collimator). As a result, the point spread function, $PSF_{fanbeam}(x)\ \alpha$ Gaussian ($FWHM_F(x)$). And, $$FWHM_F(x) \alpha \frac{HD}{T/\sin\alpha(x)} (R+T/\sin\alpha(x)),$$

which significantly impacts the resolution. Similarly, with some collimators, the hole diameter is not constant for all holes and the point spread function would change accordingly.

Depending on the collimator design, resolution and sensitivity may or may not be stationary. That is, in general, PSF $(\vec{r})$, where $\vec{r}$ is the location of the detection (e.g., cone-beam or other 3-D-conversion collimator). Thus, a simple rebinning and subsequent use of 3D-modelling with iterative method (e.g., OSEM-3D) will not be accurate.

Therefore, there is a need for new and improved systems and methods for the rebinning of projection data using different collimators.

SUMMARY OF THE INVENTION

This invention includes a system and method for re-binning projection data from nuclear medicine imagine devices for different collimators. According to the present invention, projection data acquired using a first collimator may be converted to projection data as if it were acquired by a second collimator.

According to one embodiment of the present invention, a method for re-binning projection data is provided. First projection data is acquired with a nuclear medicine imaging device using a first collimator. The first projection data is re-binned to second projection data that would have been acquired if using a second collimator. The rebinning step includes iterating a physical model to produce data that reflect the physical properties as if it were acquired by the second collimator.

The re-binning method of the present invention can be applied accurately for conversion from any collimator of a group of collimators to another collimator of the group.

According to an embodiment of the present invention, a method is provided for fanbeam rebinning and subsequent compensation for non-isouniformity and resolution to regular parallel beam ordered subset expectation maximization (EM) (3D-OSEM) (SPECT) reconstruction.

According to another embodiment of the present invention, a method is provided for converting projection data acquired by a nuclear medical imaging device using a first collimator to projection data as if it were acquired with a second collimator. The method includes steps for modeling the first and second collimators with first and second mathematical models; steps for receiving raw object projection data acquired using the first collimator; and steps for iteratively projecting the raw object projection data backward and forward through the first and second mathematical models to generate estimated projection data as object projection data as if acquired with said second collimator.

According to another embodiment of the present invention, a method is provided for converting SPECT projection data acquired with a SPECT device utilizing a first collimator to estimated SPECT data as if it were acquired with a second collimator. The method includes steps for acquiring raw object projection data using a first collimator; steps for converting the raw data to estimated second collimator data based on geometric mapping from the first collimator to the second collimator; and steps for performing resolution compensation of the estimated collimator data to generate estimated second collimator data.

According to another embodiment of the present invention, a nuclear imaging device includes a detector, a first collimator and a processing means. The detector is configured to receive radiation from a source object and output raw projection data. The first collimator is a first type of collimator and filters radiation from the radiation source to the detector. The processing means is for receiving raw projection data from the detector and converting the raw projection data to estimated projection data as if it were acquired with a second collimator, with a model of the first collimator and a model of the second collimator. The first collimator is a different type of collimator than the second collimator.

According to another embodiment of the present invention, a computer program is provided for converting object projection data for use in nuclear medical imaging. A first program segment receives raw object projection data from a nuclear imaging device. The raw object projection data is acquired with a first collimator. A second program segment converts the raw object projection data to estimated projection data as if it were acquired with a second collimator utilizing a model of the first collimator and a model of the second collimator. The first collimator is a different type of collimator than the second collimator Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The present invention compensates for the non-stationary resolution and sensitivity issues that arise during or after the rebinning process and prepares projection data as if it had been acquired from a different, specified collimator for use in 3-D iterative SPECT reconstruction, such as 3D-OSEM. The present invention can be applied to convert data acquired with any 3-D beam converging or diverging collimator to parallel hole collimator data, or vice versa.

Figure 1:
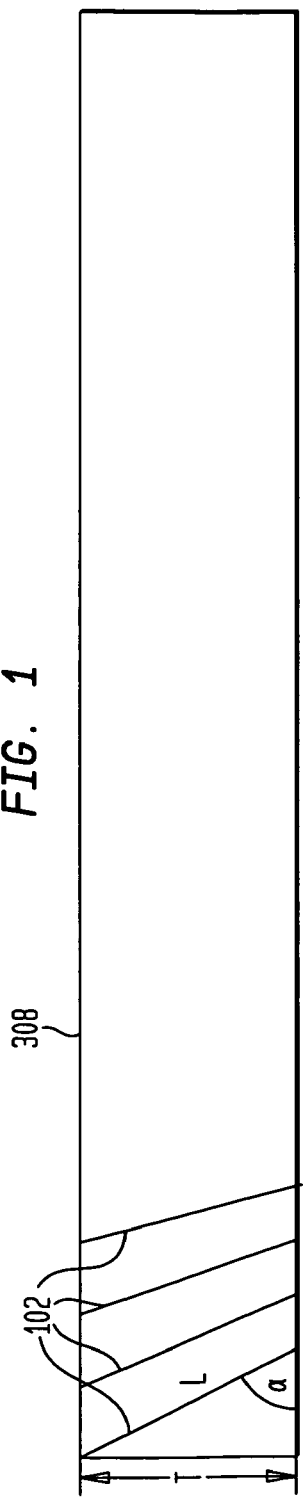
FIG. 1 is a diagram of a collimator hole.
Figure 2A:
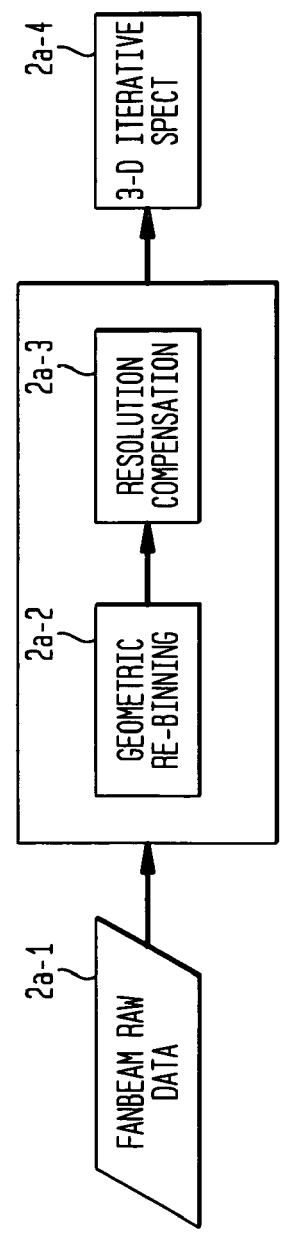
FIGS. 2(*a*)-(*b*) show the sampling locations of a representative detector and the responses measured from the same detector, respectively.

FIG. 2*a* is a flow chart of a method for performing collimator data conversion according to an embodiment of the present invention. Fanbeam to parallel hole conversion is used as an example for illustrative purposes. In this example, projection data acquired by a nuclear imaging device using a fanbeam collimator is converted to projection data as if it were acquired with a parallel hole collimator. However, the invention is not intended to be limited to fanbeam-to-parallel-hole conversions, and one skilled in the art will readily understand that any collimator conversion may be performed using the disclosed invention.

In step 2*a*-1, fanbeam raw projection data is acquired with a nuclear medicine imaging device (e.g., a gamma-ray camera), and the projection data is input into a geometric rebinning algorithm at step 2*a*-2. In geometric rebinning, the projection data are rebinned by known methods based on the geometric characteristics of the fanbeam collimator and the parallel hole collimator. For example, a method for converting collimator data based upon geometric considerations is described in U.S. Pat. No. 4,752,691, the contents of which are hereby incorporated by reference in their entirety. Other techniques are described in "Radiological Imaging," by H. H. Barrett, V2, 1981, at pp. 423-430, the entire contents of which are hereby incorporated by reference in their entirety.

The rebinned projection data needs to be adjusted to account for the physical properties of the collimators. At step 2*a*-3, the geometrically rebinned projection data is processed by a resolution compensation algorithm that is based on calibration data, to remove, e.g., sensitivity artifacts from the data. Correction can be made using a sensitivity mapping for the collimator. Calibration steps could utilize estimated parameters modeling the collimator. Furthermore, if computed tomography data is available, the CT data then can be used for attenuation correction. Also, steps 2*a*-2 and 2*a*-3 can be iterated backward and forward.

Lastly, at step 2*a*-4, the collimator data may be input into a 3-D iterative SPECT reconstruction process for parallel hole data to create the image.

Figure 2B:
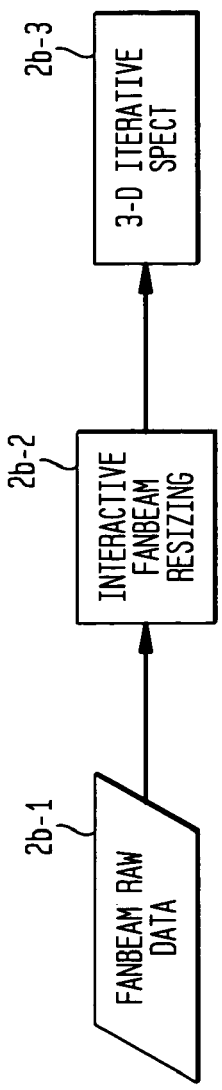
Figure 3:
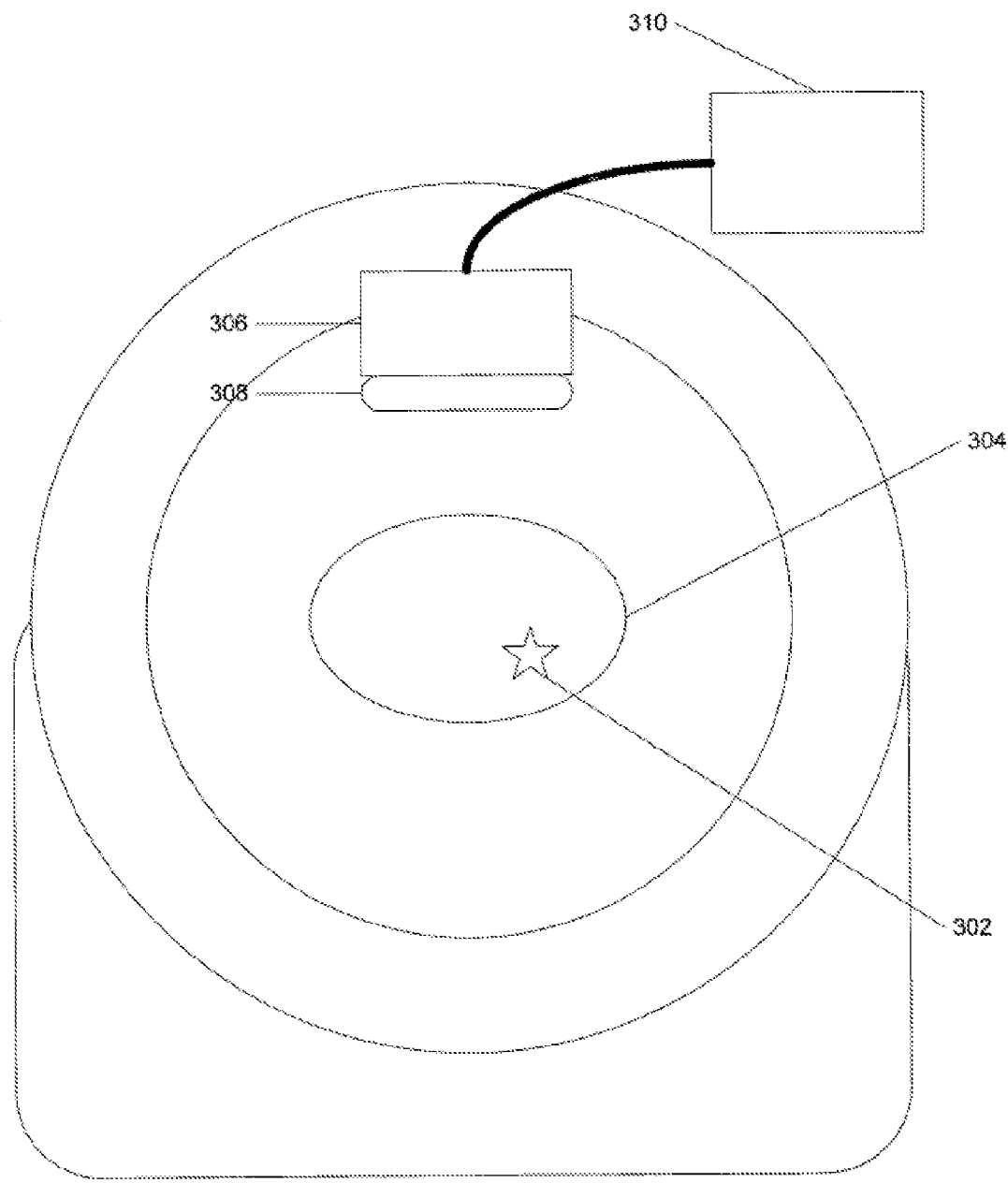
FIG. 3 is a block diagram of a SPECT system.

A method for converting collimator data according to another embodiment of the present invention is shown in FIG. 2*b*. Like the example of FIG. 2*a*, fanbeam to parallel hole conversion is used to illustrate the method.

At step 2*b*-1, raw projection data acquired using a fanbeam collimator is input into an iterative rebinning process at step 2*b*-2. Models (e.g., mathematical models) are created for the collimator used to acquire the data as well as for the target collimator. For example, Monte Carlo models could be used to simulate the paths of photons passing through the collimator to the crystal and/or the data may be parameterized. Using the models, the data may be projected forward and backward iteratively until the estimated parallel hole data is obtained. The raw projection data of an object being imaged is run backwards through the fanbeam model to obtain object data and forwards through the parallel hole data to obtain estimated parallel hole data. This process is repeated iteratively until the estimated parallel hole data matches the object data.

Using an example of a PWLS (penalized weighted least squares) method (or an ML (maximum likelihood) based method), the estimated parallelized fan-beam data can be represented by:

Estimated Parallelized Fan-beam Data, $\tilde{PFD}$ is the projection data from non-physical parallel hole collimator;

True Parallel Data, TPD, represents actual measured data with a real physical collimator (parallel hole in this case);

Fan beam Data is represented by FD; and

Model Fanbeam Data is represented by MFD;

$$\tilde{PFD} = \operatorname{argmin} \|(FD, MFD(\tilde{PFD}))\|;$$

for $\|\blacksquare\|$ some norm$((FD-MFD)^2)$; and $(\blacksquare, \blacksquare)$ distance measured=FD-MFD.

The iterative process could be initiated using the geometric technique described above. That is, the output of the geometric rebinning method could be used as input to the iterative rebinning process of FIG. 2*b*.

Scaler correction may be performed using energy window scaler projection estimation (SPE) followed by more rebinning of all data from peak window of an SPE and then 3-D iterative SPECT. Peak data and scaler projection estimate data may both be processed through the parallelization method of FIGS. 2*a* and 2*b*, and then both through the an OSEM-3D SPECT reconstruction process with scaler correction and attenuation correction. CT data for the same object could be used as a priori information to mitigate truncation problems.

According to another embodiment of the present invention, rebinning processes may be generalized. Let $D(\vec{r})$ be an activity distribution at position vector $(\vec{r})$, let $CM_i$ being a collimator model (e.g., low energy high resolution (LEHR) and low energy high sensitivity (LEHS)), and let $\tilde{P}_{CMi}$ be projection data generated by $CM_i$. Let T be the transfer matrix which computes projection data $\tilde{P}_{CMi} = T_{ij}(\tilde{P}_{CMj})$, for collimators i and j.

Next, $T_{ij}^{-1}$ can be determined by:

$$\tilde{P}_{CMi} = CM_i(D); \tilde{P}_{CMj} = CM_j(D),$$

using an iterative method, one can essentially transfer from $CM_i$ to $CM_j$, and especially if $P_i$ is the true projection data measured with collimator(-type) i, then one can transform any projection data to projection data as if it came from another collimator by:

$$P_{CMj} = \text{argmin } \|(P_i, T_{ij}(P_{CMi})\|.$$

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

I claim:

1. A method for converting projection data acquired by a nuclear medical imaging device using a first collimator into projection data as if the acquired data were acquired with a second collimator, said method comprising the steps of:
    a) modeling said first and second collimators with first and second mathematical models;
    b) receiving raw object projection data acquired using said first collimator; and
    c) iteratively projecting the raw object projection data backward and forward through the first and second mathematical models to generate estimated projection data as object projection data as if acquired with said second collimator.

2. The method as recited in claim 1, wherein said steps for modeling said first and second collimators include using Monte Carlo methods to model photon paths through said first and second collimator.

3. The method as recited in claim 1, further comprising a step for generating an image by reconstructing said estimated projection data with a standard reconstruction algorithm for the type of collimator of said second collimator.

4. The method as recited in claim 1, wherein said step of iteratively projecting includes the steps of geometrically rebinning said raw object projection data into geometrically rebinned projection data and iteratively projecting the geometrically rebinned projection data backward and forward through the first and second mathematical models to generate estimated projection data as if the object projection data were acquired with said second collimator.

5. The method as recited in claim 1, wherein said step of receiving raw object projection data acquired using said first collimator includes providing a SPECT device utilizing a converging type collimator and exposing an object with said SPECT device.

6. The method as recited in claim 1, wherein said step of receiving raw object projection data acquired using said first collimator includes providing a SPECT device utilizing a fanbeam type collimator and exposing an object with said SPECT device; and
    wherein said second collimator is a parallel hole type collimator.

7. The method as recited in claim 1, wherein said step of modeling said first and second collimator model a point spread function of each hole of said first and second collimator.

8. The method as recited in claim 5, wherein said step of modeling said first and second collimator model a point spread function of each hole of said first and second collimator.

9. The method as recited in claim 6, wherein said step of modeling said first and second collimator model a point spread function of each hole of said first and second collimator.

10. A method for converting projection data acquired by a nuclear medical imaging device using a first collimator into projection data as if it were acquired with a second collimator, said method comprising:
    a) receiving raw object projection data acquired using a first collimator;
    b) projecting the raw object projection data backward through a first model physically modeling said first collimator to obtain first estimated object data;
    c) projecting the first estimated object data forward through a second model physically modeling said second collimator to obtain estimated second collimator projection data;
    d) projecting the estimated second collimator projection data backward through said second model to obtain second estimated object data;
    e) projecting the second estimated object data forward through said first model to obtain estimated first collimator projection data;
    f) comparing said estimated first collimator projection data with said raw projection data;
    g) adjusting said first and second models based upon the results of said comparison step; and
    h) iterating steps (c)-(g) until said comparing step results in a near zero delta.

11. The method of claim 10, wherein said first collimator is a converging type collimator and said second collimator is a parallel hole type collimator.

12. The method of claim 10, wherein said first and second models are based upon physical limitations of said first and second collimators.

13. The method of claim 10, wherein said first and second models model a point spread function associated with each hole of said first and second collimators.

14. The method of claim 11, wherein said first and second models model a point spread function associated with each hole of said first and second collimators.

15. A method for converting SPECT projection data acquired with an imaging device utilizing a first collimator into estimated SPECT data as if it were acquired with a second collimator, said method comprising the steps of:

acquiring raw object data using a first collimator;
converting said raw data to estimated second collimator data based on geometric mapping from said first collimator to said second collimator; and
performing resolution compensation of said estimated collimator data to generate estimated second collimator data.

16. The method according to claim 15, wherein said first collimator is a converging type collimator and said second collimator is a parallel type collimator.

17. The method according to claim 15, wherein said step for performing resolution compensation is based upon calibration data of said imaging device.

18. The method according to claim 17, wherein said step for performing resolution compensation is further based upon apriori CT data.

19. The method according to claim 16, wherein said first collimator is a fanbeam type collimator.

20. The method according to claim 16, wherein said first collimator is a conebeam type collimator.

21. A nuclear imaging device, comprising:
a detector configured to receive radiation from a radiation field and output raw projection data of a distribution of said radiation field;
a first collimator of a first type that filters radiation from said radiation field to said detector; and
processing means for receiving raw projection data from said detector and for converting said raw projection data into estimated projection data as if it were acquired with a second collimator, with a model of said first collimator and a model of said second collimator;
wherein said first collimator is a different type of collimator than said second collimator.

22. The device as recited in claim 21, wherein said processing means models said first and second collimators using Monte Carlo methods to physically model photon paths through said first and second collimator.

23. The device as recited in claim 21, further comprising means for generating an image by reconstructing said estimated projection data with a standard reconstruction algorithm for the type of said second collimator.

24. The device as recited in claim 21, wherein said processing means geometrically rebins said raw object projection data into geometrically rebinned projection data and iteratively projects the geometrically rebinned projection data backward and forward through first and second mathematical models to generate estimated projection data as if the object projection data were acquired with said second collimator.

25. The device as recited in claim 21, wherein said first collimator comprises a converging type collimator.

26. The device as recited in claim 21, wherein said first collimator comprises a fanbeam type collimator and said second collimator comprises a parallel hole type collimator.

27. The device as recited in claim 21, wherein said processing means models a point spread function of each hole of said first and second collimator.

28. The device as recited in claim 24, wherein said processing means models a point spread function of each hole of said first and second collimator.

29. The device as recited in claim 26, wherein said processing means models a point spread function of each hole of said first and second collimator.

30. The device as recited in claim 21, wherein said first collimator comprises a conebeam type collimator and said second collimator comprises a parallel hole type collimator.

31. A computer program product embodied as computer-executable instructions stored on a computer readable medium, for converting object projection data for use in nuclear medical imaging, said program product comprising:
a first program segment for receiving raw object projection data from a nuclear imaging device, said raw object projection data acquired with a first collimator; and
a second program segment for converting said raw object projection data to estimated projection data as if it were acquired with a second collimator utilizing a model of said first collimator and a model of said second collimator;
wherein said first collimator is a different type of collimator than said second collimator.

32. The computer program product as recited in claim 31, wherein said second program segment models said first and second collimators using Monte Carlo methods to model photon paths through said first and second collimator.

33. The computer program product as recited in claim 31, further comprising a third program segment for generating an image by reconstructing said estimated projection data with a reconstruction algorithm for the type of collimator of said second collimator.

34. The computer program product as recited in claim 31, wherein said second program segment geometrically rebins said raw object projection data into geometrically rebinned projection data and iteratively projects the geometrically rebinned projection data backward and forward through first and second mathematical models to generate estimated projection data as if the object projection data were acquired with said second collimator.

35. The computer program product as recited in claim 31, wherein said first collimator comprises a converging type collimator.

36. The computer program product as recited in claim 31, wherein said first collimator comprises a fanbeam type collimator and said second collimator comprises a parallel hole type collimator.

37. The computer program product as recited in claim 31, wherein said second program segment models a point spread function of each hole of said first and second collimator.

38. The computer program product as recited in claim 34, wherein said second program segment models a point spread function of each hole of said first and second collimator.

39. The computer program product as recited in claim 36, wherein said second program segment models a point spread function of each hole of said first and second collimator.

40. The computer program product as recited in claim 31, wherein said first collimator comprises a conebeam type collimator and said second collimator comprises a parallel hole type collimator.

* * * * *